US006661656B2

(12) United States Patent
Kim et al.

(10) Patent No.: US 6,661,656 B2
(45) Date of Patent: Dec. 9, 2003

(54) COMPUTER SYSTEM AND ENCLOSURE THEREOF

(75) Inventors: David J. Kim, San Jose, CA (US); William W. Ruckman, San Jose, CA (US); Anthony Kozaczuk, Burlingame, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 138 days.

(21) Appl. No.: 09/951,171

(22) Filed: Sep. 13, 2001

(65) Prior Publication Data

US 2003/0048606 A1 Mar. 13, 2003

(51) Int. Cl.[7] .................................................. G06F 1/16
(52) U.S. Cl. .................... 361/687; 361/686; 361/615; 312/223.2; 165/80.2; 165/80.3; 454/184
(58) Field of Search .............................. 361/683, 685, 361/687, 690–695, 704, 719–721; 165/80.2, 80.3, 104.33, 185; 174/16.3, 252, 254; 454/184; 312/223.2, 223.3, 334.4, 138.1, 236, 311, 329

(56) References Cited

U.S. PATENT DOCUMENTS

| 5,168,424 | A | * | 12/1992 | Bolton et al. ............... 361/695 |
| 5,193,050 | A | * | 3/1993 | Dimmick et al. ........... 361/694 |
| 5,460,441 | A | * | 10/1995 | Hastings et al. ............ 312/298 |
| 5,865,518 | A | | 2/1999 | Jarrett et al. |
| 5,959,841 | A | | 9/1999 | Allen et al. |
| 5,978,217 | A | | 11/1999 | Kerrigan et al. |
| 6,005,770 | A | * | 12/1999 | Schmitt ...................... 361/695 |
| 6,115,250 | A | * | 9/2000 | Schmitt ...................... 361/695 |
| 6,315,655 | B1 | * | 11/2001 | McEwan et al. ............ 454/184 |
| 6,392,872 | B1 | * | 5/2002 | Doustou, III et al. ....... 361/681 |
| 6,462,670 | B1 | * | 10/2002 | Bolognia et al. ...... 340/815.45 |
| 6,504,718 | B2 | * | 1/2003 | Wu ............................. 361/695 |
| 6,525,935 | B2 | * | 2/2003 | Casebolt .................... 361/687 |

* cited by examiner

*Primary Examiner*—Michael Datskovsky
(74) *Attorney, Agent, or Firm*—Meyertons Hood Kivlin Kowert & Goetzel, P.C.; B. Noël Kivlin

(57) ABSTRACT

An enclosure includes a base having an interior portion defined by a first side panel and a second side panel and a frame joined to the first side panel and the second side panel such that the frame extends across the interior portion the base. A computer system includes a motherboard having a central processing unit, a power supply capable of supplying power to the motherboard, and an enclosure capable of housing the motherboard and the power supply. The enclosure includes a base having an interior portion defined by a first side panel and a second side panel and a frame joined to the first side panel and the second side panel such that the frame extends across the interior portion of the base.

32 Claims, 2 Drawing Sheets

COMPUTER SYSTEM AND ENCLOSURE THEREOF

BACKGROUND OF THE INVENTION

1. Field of the Invention

This invention relates to computer system and an enclosure for such a computer system.

2. Description of the Related Art

Computer systems are general-purpose devices that may be modified to perform particular tasks or functions. Generally, computer systems include a motherboard, a power source, and other components mounted within an enclosure. Some enclosures are adapted to mount into computer system racks, thus allowing many such computer systems to be housed in close proximity to one another.

Conventional racks are typically made in standardized sizes. For example, some racks are designed to accommodate enclosures having depths of no greater than about 610 mm. To maximize the number of components that can be housed within an enclosure, computer system manufacturers have typically utilized enclosures having maximum depths that can be accommodated by such racks. As a result, any cables extending from the rear of such computer systems often fall outside the envelope of the racks holding the computer systems, thus increasing the chance that the cables may be inadvertently damaged. Further, if cable management devices are used to route the cables between computer systems and other peripheral components, these devices are typically mounted to the outside of the rack, thus decreasing the number of racks that can be used in an area.

Some enclosures are adapted to be used in "desktop" computer systems and, as a rule, take up a considerable area on a desktop. As it is beneficial for a user to maximize the available work area on his or her desktop, it is generally desirable to minimize the area of the desktop taken up by desktop computer systems.

One way of minimizing the area of the desktop taken up by such a computer system is to place a monitor for the computer system on top of the computer system. Conventional computer system enclosures may not have sufficient strength and stiffness to hold such monitors without deflecting and, in some instances, deforming. One answer to this problem has been to add stiffening elements to the upper cover of the enclosure. Such stiffening elements, however, may decrease the available height within the enclosure for components within the enclosure, such as expansion cards, if an overall height of the enclosure is to be maintained within specification.

Many of the components in a computer system (e.g., processor chips, power supplies, and the like) require that they be cooled to operate properly. Such components are generally cooled using air forced over and around the components by one or more fans incorporated into the computer system. As computer systems become more powerful and versatile, the heat generated by components in the computer systems generally increases, requiring additional fans to maintain a suitable operating temperature within the computer system. Additional fans take up volume within the computer system enclosure that is typically needed for other components and increase the power required to operate the computer systems.

SUMMARY OF THE INVENTION

In one aspect of the present invention, an enclosure is presented. The enclosure includes a base having an interior portion defined by a first side panel and a second side panel and a frame joined to the first side panel and the second side panel such that the frame extends across the interior portion the base.

In another aspect of the present invention, a computer system is presented. The computer system includes a motherboard having a central processing unit, a power supply capable of supplying power to the motherboard; and an enclosure capable of housing the motherboard and the power supply. The enclosure includes a base having an interior portion defined by a first side panel and a second side panel and a frame joined to the first side panel and the second side panel such that the frame extends across the interior portion of the base.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
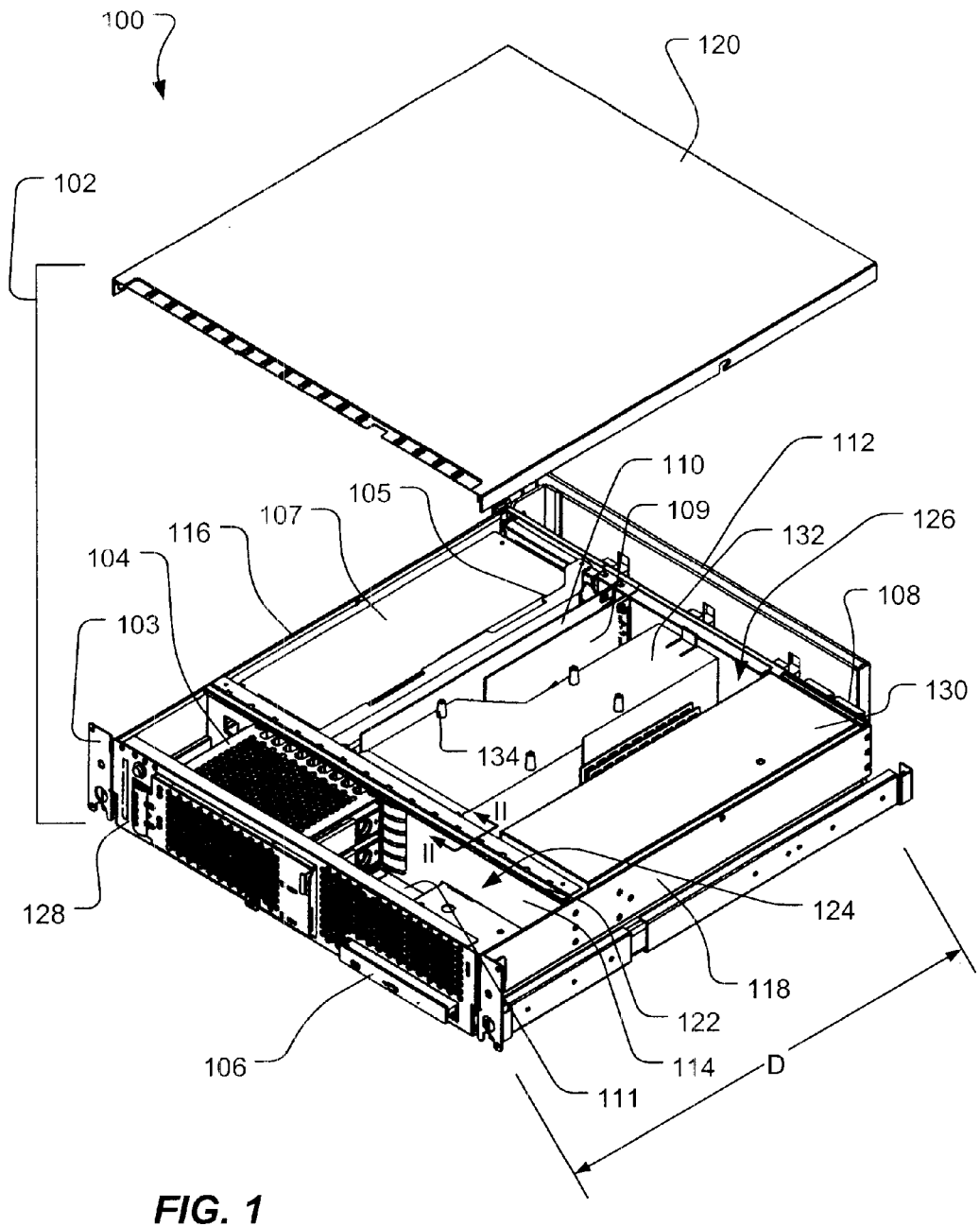
FIG. 1 is a partially-exploded perspective view of a computer system according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 2:
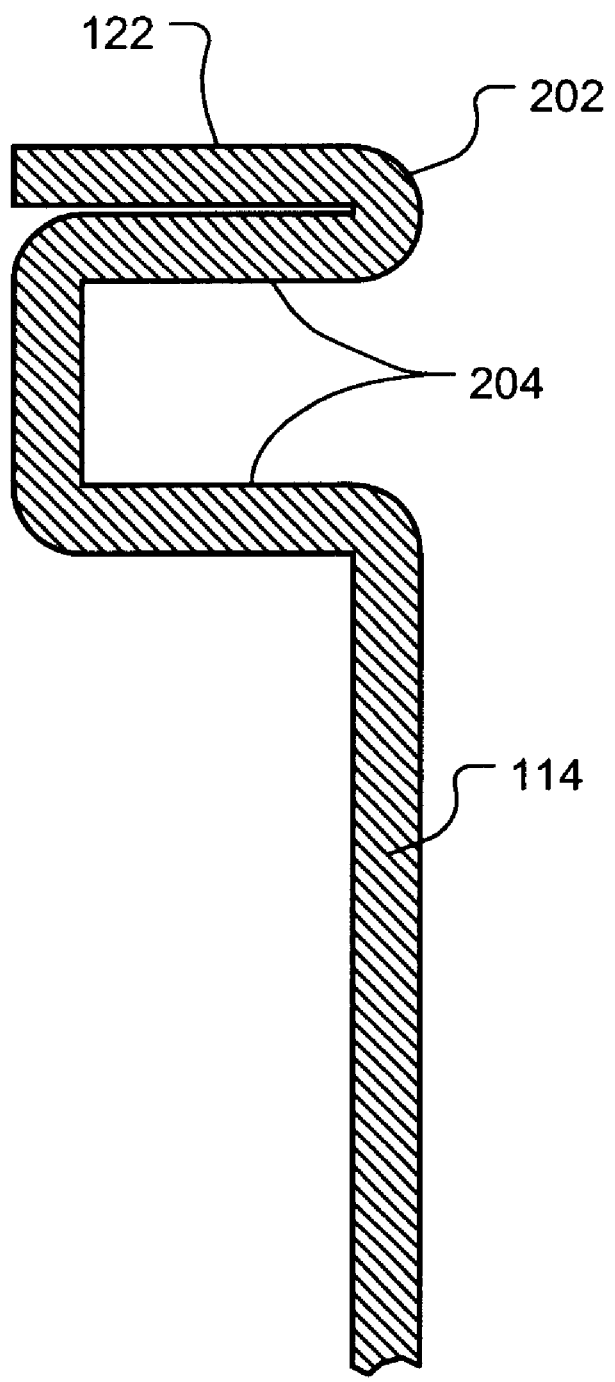
FIG. 2 is a is a partial cross-sectional view of a frame of the computer system illustrated in FIG. 1 taken along a II—II line.

A computer system 100 according to the present invention is illustrated in FIGS. 1 and 2. The computer system 100 includes an enclosure 102 housing one or more components, e.g., a motherboard (not shown), a hard disk drive 104, a CD-ROM drive 106, a riser card 105, one or more expansion cards 107, 109, 110, and a power supply (not shown). In the illustrated embodiment, the expansion card 107 is mated with the riser card 105, which is, in turn, mated with the motherboard. However, it is within the scope of the present invention for a plurality of expansion cards (e.g., the expansion card 107) to be mated with the riser card 105. Further, it is within the scope of the present invention for the riser card 107 to be capable of mating with a plurality of expansion cards (e.g., the expansion card 107). The computer system 100 further includes a cable arm 112 for routing cables (not shown) extending from various components of the computer system 100. In the illustrated embodiment, the cable arm 112 is joined to a base 103 of the enclosure 102.

As illustrated in FIG. 1, the enclosure 102 includes a frame 114 disposed within an interior portion of the base 103 of the enclosure 102 and extends from a first side 116 to a second side 118 of the base 103. Each of the first side 116 and the second side 118 extend upwardly from a floor 111 of the base 103. The frame 114 may be joined to the first side 116 and the second side 118 by any desired joining method, e.g., by screws, nuts and bolts, rivets, clips, adhesives, welds, or the like. Accordingly, the frame 114 increases the strength and stiffness of the enclosure 102. In one embodiment of the present invention, illustrated in FIG. 2, the frame 114 comprises a hem 202 and a channel 204 at its upper end that is capable of increasing the rigidity of the frame 114 and thus the strength and stiffness of the enclosure 102. Further, with a cover 120 engaged with the base 102, a top surface 122 of the frame 114 is adjacent to the cover 120 to provide support to the cover 120. Thus, the enclosure 102 with the cover 120 and the frame 114 has improved strength and stiffness properties to support a monitor (not shown) or the like placed on the cover 120 of the enclosure 102.

The frame 114, when installed as illustrated, separates the interior of the base 103 into a front compartment 124 and a rear compartment 126. The front compartment 124 is adapted to house removable devices or components, e.g., a hard disk drive 104, a CD-ROM drive 106, a tape drive (not shown), a smart card reader (not shown), and the like. These components may be hot pluggable, i.e., they can be connected or disconnected at any time, even with the power on. The components may be installed or removed through openings (not shown) in a front panel 128. The rear compartment 126 is adapted to house various components of the computer systems 100, e.g., the motherboard, the power supply, the riser card 105, and the expansion cards 107, 109, 110.

In the illustrated embodiment, the computer system 100 further comprises a power supply plenum 130, disposed within the rear compartment 126, for routing cooling air over the power supply (not shown) housed within the power supply plenum 130. The cooling air is driven by one or more power supply fans 108. The power supply plenum 130 directs the cooling air around the power supply, rather than throughout the enclosure, thus increasing the efficiency of the cooling air to cool the power supply.

A similar approach is also applied to cooling components (e.g., central processing unit (CPU) chips and the like) on the motherboard. In the illustrated embodiment, a CPU plenum 132 is provided within the rear compartment 126 for routing cooling air that is driven by one or more fans (not shown) within the CPU plenum 132. As with the power supply plenum 130, the CPU plenum 132 directs the cooling air around one or more CPU chips on the motherboard, rather than throughout the enclosure, thus increasing the efficiency of the cooling air to cool the CPU chips. At least one member 134 extends from the CPU plenum 132 to provide additional support to the cover 120.

As a result of the layout of the computer system 100 described above, the enclosure 102 has a smaller depth D than conventional enclosures while providing sufficient volume for housing various components of the computer system 100. In one embodiment, the enclosure 102 has a depth (e.g., the depth D) within a range of about 480 mm to about 490 mm, as compared to a conventional enclosure having a depth of about 610 mm. Thus the computer system 100 with the cable arm 112 attached thereto may fit within an envelope of a rack (not shown) in which the computer system 100 is installed.

In an installation wherein the computer system 100 is used on a desktop, the layout of the computer system 100 described above may result in less overall desktop space being taken up by the computer system 100. As compared to conventional computer systems, the computer system 100 illustrated in FIG. 1 and any cables (not shown) extending from the rear of the computer system 100 may occupy generally the same desktop area as a conventional computer system alone.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. An enclosure comprising:
    a base having an interior portion defined by a first side panel and a second side panel;
    a frame joined to the first side panel and the second side panel such that the frame extends across the interior portion of the base; and
    wherein the frame comprises a hem at an upper end of the frame.

2. An enclosure, according to claim 1, wherein the frame separates the interior portion of the base into a front compartment and a rear compartment.

3. An enclosure, according to claim 2, wherein the front compartment is adapted to house at least one device selected from the group consisting of a hard disk drive, a CD ROM drive, a smart card reader, a floppy disk drive, and a tape drive.

4. An enclosure, according to claim 2, wherein the rear compartment is adapted to house at least one device selected from the group consisting of a motherboard, a power supply, a riser card, and an expansion card.

5. An enclosure, according to claim 1, further comprising a cover engagable with the base, wherein the frame has a surface capable of supporting the cover.

6. An enclosure, according to claim 1, further comprising a plenum capable of routing cooling air around a component disposed within an interior portion of the plenum.

7. An enclosure, comprising:
    a base having an interior portion defined by a first side panel and a second side panel;
    a frame joined to the first side panel and the second side panel such that the frame extends across the interior portion of the base;
    a plenum capable of routing cooling air around a component disposed within an interior portion of the plenum;
    a cover engagable with the base; and
    a member extending from the plenum to support the cover.

8. An enclosure, according to claim 1, wherein the base further comprises a rear panel and wherein the enclosure further comprises a cable arm joined to the rear panel of the base.

9. An enclosure, according to claim 8, wherein the enclosure is adapted to fit within an envelope of a rack.

10. An enclosure, according to claim 1, wherein the enclosure has a depth within a range of about 480 mm to about 490 mm.

11. An enclosure, comprising:
- a floor;
- a first wall extending upwardly from the floor;
- a second wall extending upwardly from the floor, wherein the floor, the first wall, and the second wall define an interior portion of the enclosure; and
- a frame extending from the first wall to the second wall such that the frame divides the interior portion of the enclosure into a front compartment and a rear compartment;
- wherein the frame comprises a hem and a channel at an upper end of the frame.

12. An enclosure, according to claim 11, further comprising a cover engagable with the first wall, wherein the frame has a surface capable of supporting a portion of the cover.

13. An enclosure, according to claim 11, further comprising a plenum capable of routing cooling air around a component disposed within an interior portion of the plenum.

14. An enclosure comprising:
- a floor;
- a first wall extending upwardly from the floor;
- a second wall extending upwardly from the floor, wherein the floor, the first wall, and the second wall define an interior portion of the enclosure;
- a frame extending from the first wall to the second wall such that the frame divides the interior portion of the enclosure into a front compartment and a rear compartment;
- a plenum capable of routing cooling air around a component disposed within an interior portion of the plenum;
- a cover engagable with the first wall; and
- a member extending from the plenum to support the cover.

15. A computer system, comprising:
- a motherboard having a central processing unit;
- a power supply capable of supplying power to the motherboard; and
- an enclosure capable of housing the motherboard and the power supply, comprising:
  - a base having an interior portion defined by a first side panel and a second side panel;
  - a frame joined to the first side panel and the second side panel such that the frame extends across the interior portion of the base;
  - wherein the frame comprises a hem and a channel at an upper end of the frame.

16. A computer system, according to claim 15, wherein the frame separates an interior of the enclosure into a front compartment and a rear compartment.

17. A computer system, according to claim 16, wherein the front compartment is adapted to house at least one device selected from the group consisting of a hard disk drive, a CD ROM drive, a smart card reader, a floppy disk drive, and a tape drive.

18. A computer system, according to claim 16, wherein the rear compartment is adapted to house at least one device selected from the group consisting of the motherboard, the power supply, a riser card, and an expansion card.

19. A computer system, according to claim 15, further comprising a cover engagable with the base, wherein the frame has a surface capable of supporting the cover.

20. A computer system, according to claim 15, further comprising:
- a fan capable of moving air to cool a component of the computer system; and a plenum capable of routing the air, moved by the fan, around the component, wherein the component is disposed within an interior portion of the plenum.

21. A computer system comprising:
- a motherboard having a central processing unit;
- a power supply capable of supplying power to the motherboard; and
- an enclosure capable of housing the motherboard and the power supply, comprising:
  - a base having an interior portion defined by a first side panel and a second side panel;
  - a frame joined to the first side panel and the second side panel such that the frame extends across the interior portion of the base;
  - a fan capable of moving air to cool a component of the computer system; and a plenum capable of routing the air, moved by the fan, around the component, wherein the component is disposed within an interior portion of the plenum;
  - a cover engagable with the base; and
  - a member extending from the plenum to support the cover.

22. A computer system, according to claim 16, further comprising:
- a fan capable of moving air to cool the power supply; and
- a power supply plenum capable of routing the air, moved by the fan, around the power supply, wherein the power supply is disposed within an interior portion of the power supply plenum.

23. A computer system, according to claim 22, further comprising a member extending from the power supply plenum to support the cover.

24. A computer system, according to claim 16, further comprising:
- a fan capable of moving air to cool the central processing unit; and
- a central processing unit plenum capable of routing the air, moved by the fan, around the central processing unit, wherein the central processing unit is disposed within an interior portion of the central processing unit plenum.

25. A computer system comprising:
- a motherboard having a central processing unit;
- a power supply capable of supplying power to the motherboard; and
- an enclosure capable of housing the motherboard and the power supply, comprising:
  - a base having an interior portion defined by a first side panel and a second side panel;
  - a frame joined to the first side panel and the second side panel such that the frame extends across the interior portion of the base;
  - wherein the frame separates an interior of the enclosure into a front compartment and a rear compartment;
  - a fan capable of moving air to cool the central processing unit;
  - a central processing unit plenum capable of routing the air, moved by the fan, around the central processing unit, wherein the central processing unit is disposed within an interior portion of the central processing unit plenum; and at least one member extending from the central processing unit plenum to support the cover.

26. A computer system, according to claim 16, wherein the base further comprises a rear panel and wherein the enclosure further comprises a cable arm joined to the rear panel of the base.

27. A computer system, according to claim 26, wherein the enclosure is adapted to fit within an envelope of a rack.

28. A computer system, according to claim 16, wherein the enclosure has a depth within a range of about 480 mm to about 490 mm.

29. A computer system, according to claim 16, wherein the computer system further comprises:

a riser card mated with the motherboard; and an expansion card mated with the riser card.

30. A computer system, according to claim 29, wherein the riser card is capable of mating with a plurality of expansion cards.

31. A computer system, according to claim 16, wherein the computer system further comprises:

a riser card mated with the motherboard; and a plurality of expansion cards mated with the riser card.

32. The enclosure of claim 1, wherein the frame further comprises a channel at the upper end of the frame.

* * * * *